(12) United States Patent
De Paula et al.

(10) Patent No.: US 10,649,634 B2
(45) Date of Patent: May 12, 2020

(54) INDEXING AND ANNOTATING A USABILITY TEST RECORDING

(71) Applicant: International Business Machines Corporation, Armonk, NY (US)

(72) Inventors: Rogerio Abreu De Paula, Sao Paulo (BR); Claudio Santos Pinhanez, Sao Paulo (BR); Vagner Figueredo De Santana, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 14/298,137

(22) Filed: Jun. 6, 2014

(65) Prior Publication Data
US 2015/0356062 A1    Dec. 10, 2015

(51) Int. Cl.
*G06F 3/00* (2006.01)
*G06F 3/0484* (2013.01)
*G06F 11/34* (2006.01)
*G06F 3/0481* (2013.01)
*G06F 3/048* (2013.01)
*G06F 17/40* (2006.01)

(52) U.S. Cl.
CPC .......... *G06F 3/04842* (2013.01); *G06F 3/048* (2013.01); *G06F 3/0484* (2013.01); *G06F 3/04817* (2013.01); *G06F 11/3438* (2013.01); *G06F 17/40* (2013.01); *G06F 2201/835* (2013.01); *G06F 2201/86* (2013.01)

(58) Field of Classification Search
CPC .... G06F 3/048; G06F 3/04817; G06F 3/0484; G06F 3/04842
See application file for complete search history.

(56) References Cited

U.S. PATENT DOCUMENTS

| 5,590,057 | A |   | 12/1996 | Fletcher et al. |
| 5,708,767 | A | * | 1/1998 | Yeo .................... G06F 17/30811 345/440 |
| 6,173,317 | B1 | * | 1/2001 | Chaddha ........... G06F 17/30056 348/E7.063 |
| 6,205,575 | B1 | * | 3/2001 | Sherman .................... G06F 8/10 715/967 |
| 6,266,053 | B1 | * | 7/2001 | French .................. G06T 17/005 345/440 |
| 6,384,843 | B1 |   | 5/2002 | Harel |

(Continued)

OTHER PUBLICATIONS

IEEE 100: The Authoritative Dictionary of IEEE Standards Terms, IEEE Press, 7th Ed. Dec. 11, 2000, 4 pages (excerpts).

(Continued)

*Primary Examiner* — Kieu D Vu
*Assistant Examiner* — Andrew Chung
(74) *Attorney, Agent, or Firm* — Joseph Petrokaitis; Otterstedt, Wallace & Kammer, LLP

(57) ABSTRACT

A method for indexing a user interface test recording includes capturing, during a session, a recording of a plurality of interactions with the user interface, capturing, during the session, an event stream including a plurality of user interface events, synchronizing, in time, the plurality of interactions and the plurality of user interface events, identifying a point of interest in the event stream, wherein the point of interest is correlated to a time in the recording by the synchronization, and annotating the recording at a time correlated to when the point of interest occurred.

20 Claims, 4 Drawing Sheets

(56) References Cited

U.S. PATENT DOCUMENTS

| | | | |
|---|---|---|---|
| 6,549,216 B1 | 4/2003 | Schumacher et al. | |
| 6,665,835 B1 | 12/2003 | Gutfreund | |
| 6,976,218 B2 | 12/2005 | Stanford-Clark | |
| 7,131,059 B2* | 10/2006 | Obrador | G06F 17/30056 707/E17.028 |
| 7,215,338 B2* | 5/2007 | Horn | A61B 1/00009 345/440 |
| 7,257,774 B2* | 8/2007 | Denoue | G06F 17/30017 707/E17.009 |
| 7,805,675 B2* | 9/2010 | Cradick | G06F 11/3636 707/672 |
| 7,827,486 B2* | 11/2010 | Mayer-Ullmann | G06F 9/4443 715/704 |
| 7,941,525 B1* | 5/2011 | Yavilevich | G06Q 30/02 709/203 |
| 7,954,049 B2* | 5/2011 | Fletcher | G06F 17/241 707/608 |
| 8,276,077 B2* | 9/2012 | Segal | G06F 3/0488 345/2.2 |
| 8,332,765 B2 | 12/2012 | Ergan et al. | |
| 8,464,164 B2* | 6/2013 | Hon | G06F 17/30058 715/751 |
| 8,665,333 B1* | 3/2014 | Sharma | G06K 9/00771 348/135 |
| 8,693,842 B2* | 4/2014 | Srinivas | G11B 27/031 386/240 |
| 8,805,929 B2* | 8/2014 | Erol | G06F 17/30884 709/204 |
| 8,806,320 B1* | 8/2014 | Abdo | G06F 17/30017 715/203 |
| 8,849,823 B2* | 9/2014 | Gotz | G06T 11/206 345/440 |
| 9,032,067 B2* | 5/2015 | Prasad | G06Q 30/02 709/224 |
| 9,043,396 B2* | 5/2015 | Hammer | G06Q 10/101 345/581 |
| 2002/0101445 A1* | 8/2002 | Berque | G06Q 10/10 715/751 |
| 2003/0053420 A1 | 3/2003 | Duckett et al. | |
| 2004/0034653 A1* | 2/2004 | Maynor | G06F 17/30017 |
| 2006/0106816 A1* | 5/2006 | Oisel | G06F 17/30843 |
| 2006/0288273 A1 | 12/2006 | Erol et al. | |
| 2008/0288868 A1* | 11/2008 | Lakey | G06F 3/0483 715/716 |
| 2009/0210779 A1* | 8/2009 | Badoiu | G06F 17/3082 715/230 |
| 2009/0300475 A1* | 12/2009 | Fink | G06F 17/3082 715/230 |
| 2010/0122184 A1* | 5/2010 | Vonog | H04L 12/1827 715/753 |
| 2010/0138360 A1* | 6/2010 | Cutler | G06F 3/0481 705/36 R |
| 2010/0261495 A1* | 10/2010 | Li | H04W 24/04 455/513 |
| 2010/0281440 A1* | 11/2010 | Underkoffler | G06F 3/017 715/863 |
| 2011/0064267 A1* | 3/2011 | Cobb | G06K 9/00771 382/103 |
| 2011/0138339 A1* | 6/2011 | Webster | G06F 17/30126 715/854 |
| 2011/0289063 A1* | 11/2011 | Radlinski | G06Q 30/00 707/706 |
| 2012/0066583 A1* | 3/2012 | Priestley | G06F 9/542 715/234 |
| 2012/0210215 A1 | 8/2012 | Chrabaszcz | |
| 2012/0260205 A1* | 10/2012 | Rusu | G06Q 10/06 715/771 |
| 2013/0290786 A1* | 10/2013 | Artzi | G06F 11/3676 714/32 |
| 2013/0298018 A1* | 11/2013 | Aqrawi | G06F 3/048 715/704 |
| 2013/0326427 A1* | 12/2013 | Elias | G06F 9/4443 715/854 |
| 2014/0019879 A1* | 1/2014 | Krajec | G06F 3/0481 715/753 |
| 2014/0129190 A1* | 5/2014 | Pereira Correia Pinto | G06F 17/10 703/2 |
| 2014/0129985 A1* | 5/2014 | Morozov | G06F 3/0482 715/823 |
| 2014/0310623 A1* | 10/2014 | O'Connell, Jr. | G06F 17/3089 715/764 |
| 2014/0351766 A1* | 11/2014 | Fleming | G06F 3/0481 715/854 |
| 2014/0362687 A1* | 12/2014 | Bejerano | H04L 12/18 370/230 |
| 2015/0039982 A1* | 2/2015 | Bastide | G06F 17/30864 715/205 |
| 2015/0095841 A1* | 4/2015 | Fiedler | G06F 17/30539 715/781 |
| 2015/0339033 A1* | 11/2015 | Arnold | G06F 3/04842 715/854 |

OTHER PUBLICATIONS

Whatis?Com's Encyclopedia of Technology Terms, Que Publishing, Oct. 2001, 4 pages (excerpts).

Downing et al., Dictionary of Computer and Internet Terms, Barron's Educational Series, 10th Ed. May 1, 2009, 5 pages (excerpts).

* cited by examiner

INDEXING AND ANNOTATING A USABILITY TEST RECORDING

BACKGROUND

The present disclosure relates to methods for improving Human-Computer Interaction (HCI).

HCI evaluation methods typically involve recording a video of a user interacting with a proposed/studied user interface (UI) or device. The video recording typically captures a display screen, the user interacting with the UI, the way the user interacts with one or more hardware devices, etc. The video recording can be used for future reference, archive, documentation, and analysis.

One use of the video recording involves usability tests. The task of reviewing and analyzing recorded videos as part of a usability study can be time consuming.

BRIEF SUMMARY

According to an exemplary embodiment of the present invention, a method for indexing a user interface test recording includes capturing, during a session, a recording of a plurality of interactions with the user interface, capturing, during the session, an event stream including a plurality of user interface events, synchronizing, in time, the plurality of interactions and the plurality of user interface events, identifying a point of interest in the event stream, wherein the point of interest is correlated to a time in the recording by the synchronization, and annotating the recording at a time correlated to when the point of interest occurred.

According to an exemplary embodiment of the present invention, a computer program product is provided for indexing a user interface test recording, the computer program product comprising a computer readable storage medium having program instructions embodied therewith, the program instructions executable by a processor to cause the processor to perform a method of indexing a user interface test recording.

According to an exemplary embodiment of the present invention, an apparatus is provided configured to index a user interface test recording. The apparatus includes a recording device configured to capture, during a session, a video of a plurality of interactions with the user interface, and a computer program product comprising a computer readable storage medium having program instructions embodied therewith, the program instructions executable by a processor to embody: an event logger configured to capture, during the session, an event stream including a plurality of user interface events; a synchronizer configured to synchronize, in time, the plurality of interactions and the plurality of user interface events; a user interface modeler configured to generate a model of the user interface events; a model analyzer configured to identify a point of interest in the event stream, wherein the point of interest is correlated to a time in the recording by the synchronization; and an annotator configured to annotate the video at a time correlated to when the point of interest occurred.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

According to an exemplary embodiment of the present invention, one or more usability test videos are indexed based on user interface (UI) events recorded during a usability test. Indexed video enables Human-Computer Interaction (HCI) practitioners to navigate indexes generated for usability problem candidates. The usability problem candidates include, for example, missing features, lack of guidance, etc. In addition, the video is annotated to indicate one or more segments where the usability problem candidates occurred (e.g., misguided click) and provide more information about an identified usability problem candidate. For example, for a usability problem candidate indicating a long loading time, an index is generated and associated with a time before a load request occurs (e.g., about 500 milliseconds (ms) before the load request, or at a time in a range between 0 to 5000 ms before the load request) and the annotation presents the type of usability problem identified.

One or more embodiments of the present invention implement a method (see 100, FIG. 1) for indexing usability test videos including providing a recording device (e.g., audio/video recorder) and an event logger 101 configured to capture and log UI events. In one or more embodiments, the event logger 101 is an application executing on a computer system. During a usability test, video and interactions with an interface (i.e., UI events) are captured (102).

The recording device records a display screen and/or a user using UI. In one or more exemplary embodiments, the recording includes a video portion and an audio portion. The video portion records the display screen, movements of a cursor, and the like. The audio portion records voice commands (e.g., in a case of voice interactions) and UI feedback (e.g., UI acknowledgments output by a computer). It should be understood that one or more of the processes described herein in connection with video (e.g., synchronization, indexing, etc.) are applicable to audio.

Figure 4:
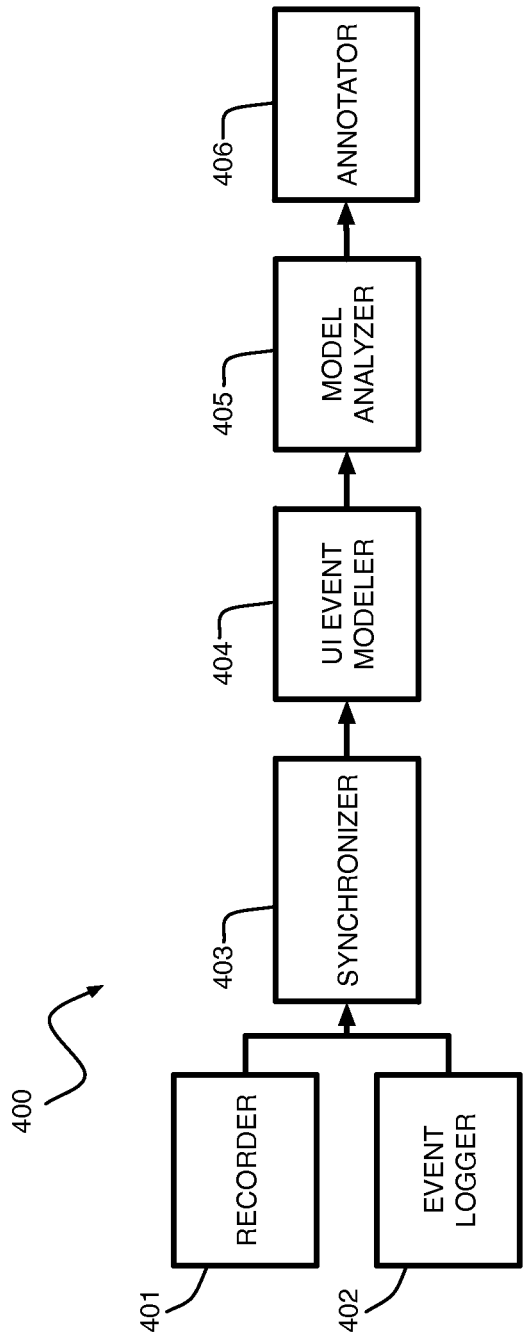
FIG. 4 is a diagram of a system configured for indexing video for identifying usability problems of a user interface according to an exemplary embodiment of the present invention.

At block 102, a video of a plurality of interactions of the user with the UI is captured, e.g., by the recording device (see 401, FIG. 4). A UI event stream is also captured at block 102, for example, by the event logger (see 402, FIG. 4), for approximately a same period of time as the video (e.g., a period sufficient to capture corresponding interactions and UI events), and the UI event stream is synchronized, in time, to the video. The UI events captured by the event logger can include, for example, mouse clicks, mouse movements, keystrokes, window scrolling, touch, swipe, pinch, voice commands, etc. It should be understood that the interactions of the user captured by the recording device correspond to the UI events in the UI event stream captured by the event logger.

The synchronization of recording of the interactions and the UI event stream can be performed using hardware and/or software embodying a synchronizer (see 403, FIG. 4) and configured to time-synchronize multiple data streams. The synchronizer can use, for example, a visual synchronization pulse or other signal output by the event logger at a known time and observed by the recorder device, wherein the visual synchronization pulse is used by the synchronizer as a reference point in time common to the recording and UI event stream. It should be understood that various methods for performing the synchronization can be used and that the present invention is not limited to the use of the visual synchronization pulse.

The UI events are analyzed at block 103. At block 103, the analysis of the captured UI events includes building an event digraph modeling the UI events performed by the user (104). In one or more embodiments of the present invention, the analysis is performed by a UI event modeler (see 404, FIG. 4). According to an embodiment of the present invention, the event digraph includes labels for each node as the concatenation of a UI event type (e.g., click, scroll, keystroke input) and a UI element identification (e.g., the name of a UI element clicked), e.g., 'click,logo'. In one or more exemplary embodiments of the present invention, in a case where the UI element identification is not given, a unique path can be generated representing the root of the UI to the referred UI event. Within the digraph, edges connecting the nodes represent a sequence in which the events occurred. The nodes are associated with information about a mean distance to a root node representing a beginning of the user's session, and a mean timestamp (e.g., a time from the beginning of the user's session). According to an exemplary embodiment of the present invention, if the same event is repeatedly triggered during the session at one specific UI element, then the mean distance to the root node and the mean timestamp are updated. Given a digraph representing an entire session (e.g., a complete usage graph structure), properties of the outgoing nodes are analyzed (105) by a model analyzer (see 405, FIG. 4).

According to an exemplary embodiment of the present invention, at block 105, if the mean distance of the outgoing node is greater than a specific statistic measure (e.g., threshold) indicating that the node is part of a cyclic or repetitive pattern (e.g., greater than mean distance of the outgoing nodes plus two times (2x) standard deviation of the mean distance from the root to the outgoing nodes), then the node is marked as a point of interest in the session (106); if the mean timestamp of the outgoing node is greater than a specific statistic measure indicating that the node is part of a cyclic or repetitive pattern (e.g., greater than mean timestamp of the outgoing nodes plus two times (2x) standard deviation of the mean timestamp of the outgoing nodes), then the node is marked as a point of interest in the session (107); and if the time interval between two events is greater than a specified limit (e.g., 10 seconds), then it is marked as an alert due to inactivity, waiting time, or user feeling stuck (108). It should be understood that different values can be used in determining points of interests (e.g., cyclic patterns, inactivity, etc.). These valves can be user selected based on an application.

According to an exemplary embodiment of the present invention, an annotation file can be generated using hardware and/or software embodying an annotator (see 406, FIG. 4) once a plurality of points of interest are marked in the digraph. To generate the annotated file (109), an annotation is generated for each identified point of interest (110), which are represented by respective nodes in the digraph. In one or more embodiment of the present invention, the points of interest are determined based on a minimum timestamp (t) of the events. In one or more embodiment of the present invention, the points of interest correspond to screen coordinates (e.g., (X,Y) coordinates), for example, in the case of mouse events or any other pointing or UI element manipulation events. An annotation can be embodied as a subtitle in the video, as an overlay on a specific region of the video, and the like. A time interval is determined for each annotation (111), during which the annotation will be presented in the video. The time interval considers an offset (o) (e.g., in ms) so that the annotation will be presented from time t-o to time t+o. In one or more embodiments, the default offset is set to 5,000 ms. The time interval can change according to the type of UI being evaluated. According to an exemplary embodiment of the present invention, distinct types of annotations can be generated. For example, annotations correspond to pointing events (e.g., mouse clicks, touch, mouse movements) and annotations correspond to non-pointing events (e.g., load, error, focus). For each annotation of the same type, intersecting periods of time are merged into a single usability problem candidate (112). For usability problem candidates involving non-pointing actions, the usability problem candidate can be displayed as a subtitle in the video (303); for usability problem candidates involving pointing actions, the annotation may be placed at the X,Y coordinates related to UI event considered (304). Once all the points of interest are converted into annotations, the annotation file (109), e.g., SRT (SubRip Text) file, is completed. SRT is a video subtitle text format that considers the definition of time intervals to present subtitle, text, and position in the screen to present the annotation. The annotation file includes all the temporized and placed annotations.

The video file recorded during the video test is associated with the annotation file generated from the event logs (113). According to an exemplary embodiment of the present invention, the association is performed by the annotator (see 406, FIG. 4). The annotation file includes usability problems candidates and indexes that can be used by HCI specialists to navigate through the video. More particularly, within the logged data, one or more points of interest are associated with a user identification, an event name, a UI element where the event was triggered, and a timestamp (e.g., recorded to millisecond accuracy) when the event was triggered.

Figure 2:
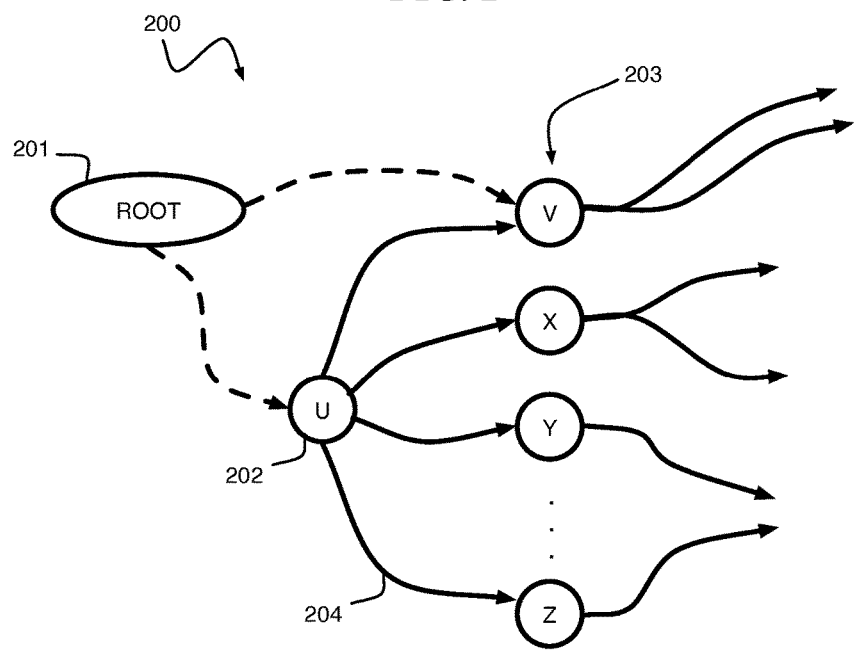
FIG. 2 is an event digraph of a video according to an exemplary embodiment of the present invention.

Referring to FIG. 2, an exemplary digraph 200 is shown including a root node 201, a node "u" 202 representing an action at a certain time in a video, and a set of neighbor nodes $n_u$ 203 (all the neighbor nodes of node u (v, x, y, . . . , z)). A mean distance from the root 201 to u 202 is written as "d(u)." A mean timestamp of all occurrences of u is written as "t(u)." Further, "f(i)" is a function applied to i values, e.g., standard deviation. A parameter to multiply the statistic is written as "a." A time limit "L" represents a long waiting time or 'stuck felling' of the user. Again, edges, e.g., 204, connecting the nodes represent a sequence in which the events occurred.

Figure 1:
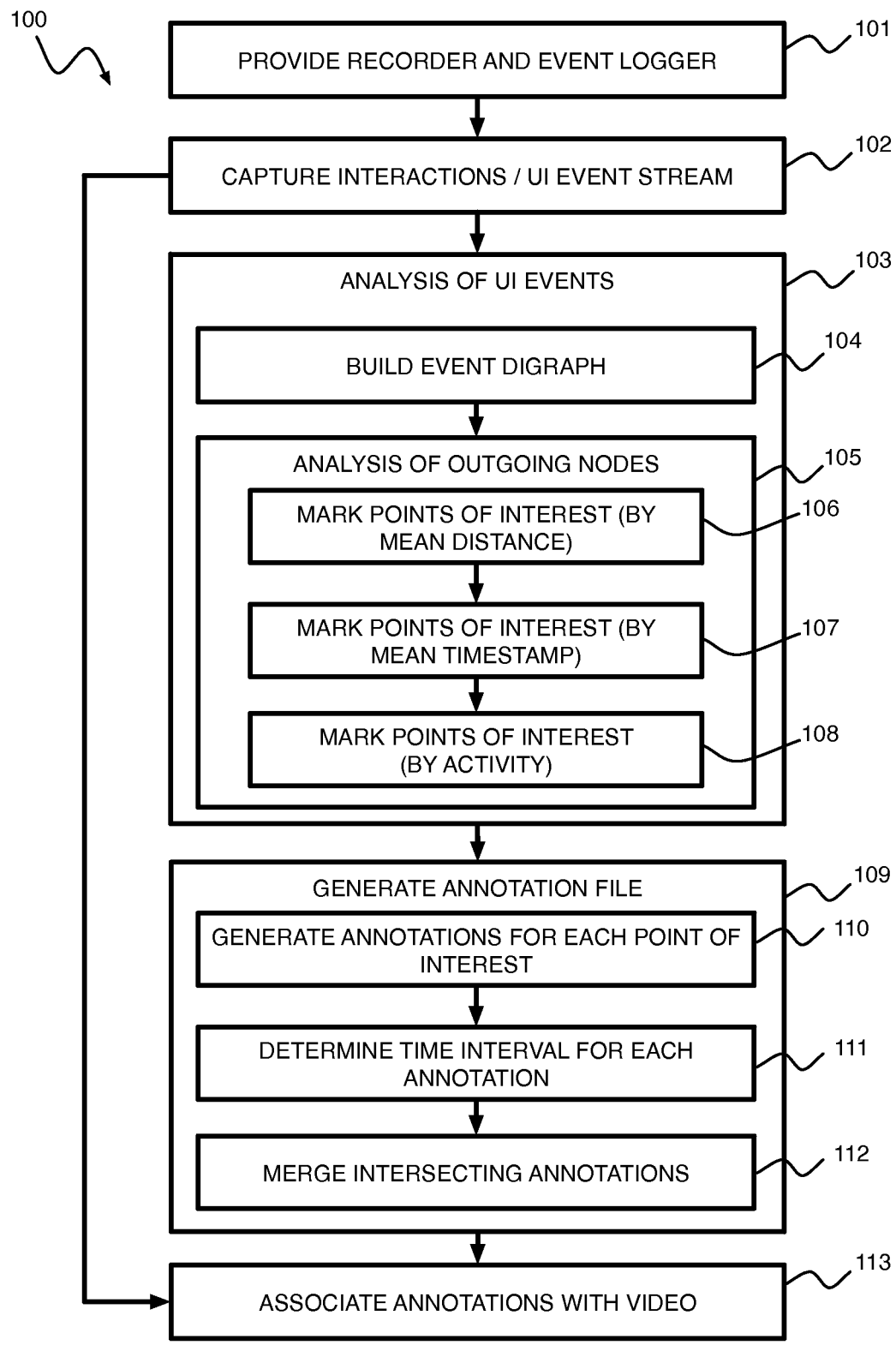
FIG. 1 is a flow diagram representing a method for indexing video for identifying usability problems of a user interface according to an exemplary embodiment of the present invention.

Given the foregoing and with reference to block 105 in FIG. 1:

if $d(u) > d(n_u) + a*f(d(n_u))$: annotate a point of interest corresponding to node u as usability problem candidate (see also block 106);

if t(u)>t($n_u$)+a*f(t($n_u$)): annotate a point of interest corresponding to node u as usability problem candidate (see also block 107); and if t($n_u$)−t(u)>L: annotate a point of interest corresponding to node u as usability problem candidate (see also block 108).

Figure 3:
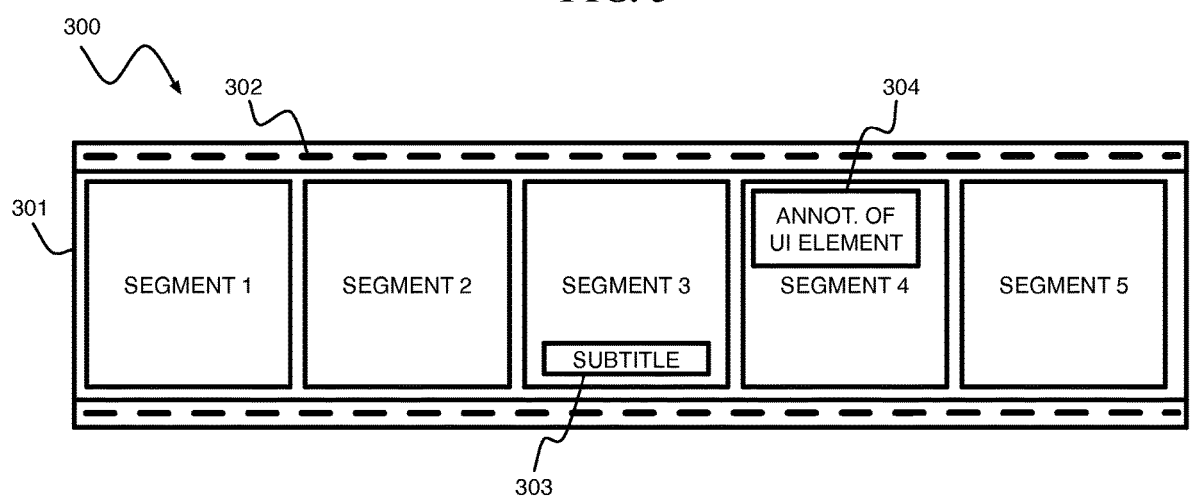
FIG. 3 is an illustration of an indexed video according to an exemplary embodiment of the present invention.

FIG. 3 is an illustration of an indexed video 300 comprising a plurality of segments 301, an index 302 and a plurality of annotations 303 and 304. Annotation 303 is a subtitle type annotation and annotation 304 is an annotation of a specific UI element (e.g., at specific (X,Y) coordinates in a video recording).

It should be understood that the methodologies of embodiments of the invention may be particularly well-suited for indexing video for identifying usability problems of a user interface.

By way of recapitulation, according to an exemplary embodiment of the present invention, a method for indexing video for identifying usability problems of a user interface includes capturing video, logging UI events, analyzing the logged data as a diagraph representation and analysis of nodes thereof for determining points of interest in the video, the generation of an annotation file corresponding to the video and the association of the annotation file with the video.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor", "circuit," "module" or "system."

Furthermore, it should be noted that any of the methods described herein can include an additional step of providing a system for indexing video for identifying usability problems of a user interface (see for example, system 400, FIG. 4) comprising distinct software modules embodied on one or more tangible computer readable storage media. All the modules (or any subset thereof) can be on the same medium, or each can be on a different medium, for example. The modules can include any or all of the components shown in the figures. In a non-limiting example, the modules include a recorder module 401, a computer-monitor module 402, a synchronizer module 403, a UI event analyzer module 404, a model analyzer module 405 and an annotator module 406. Further, a computer program product can include a tangible computer-readable recordable storage medium with code adapted to be executed to carry out one or more method steps described herein, including the provision of the system with the distinct software modules.

Figure 5:
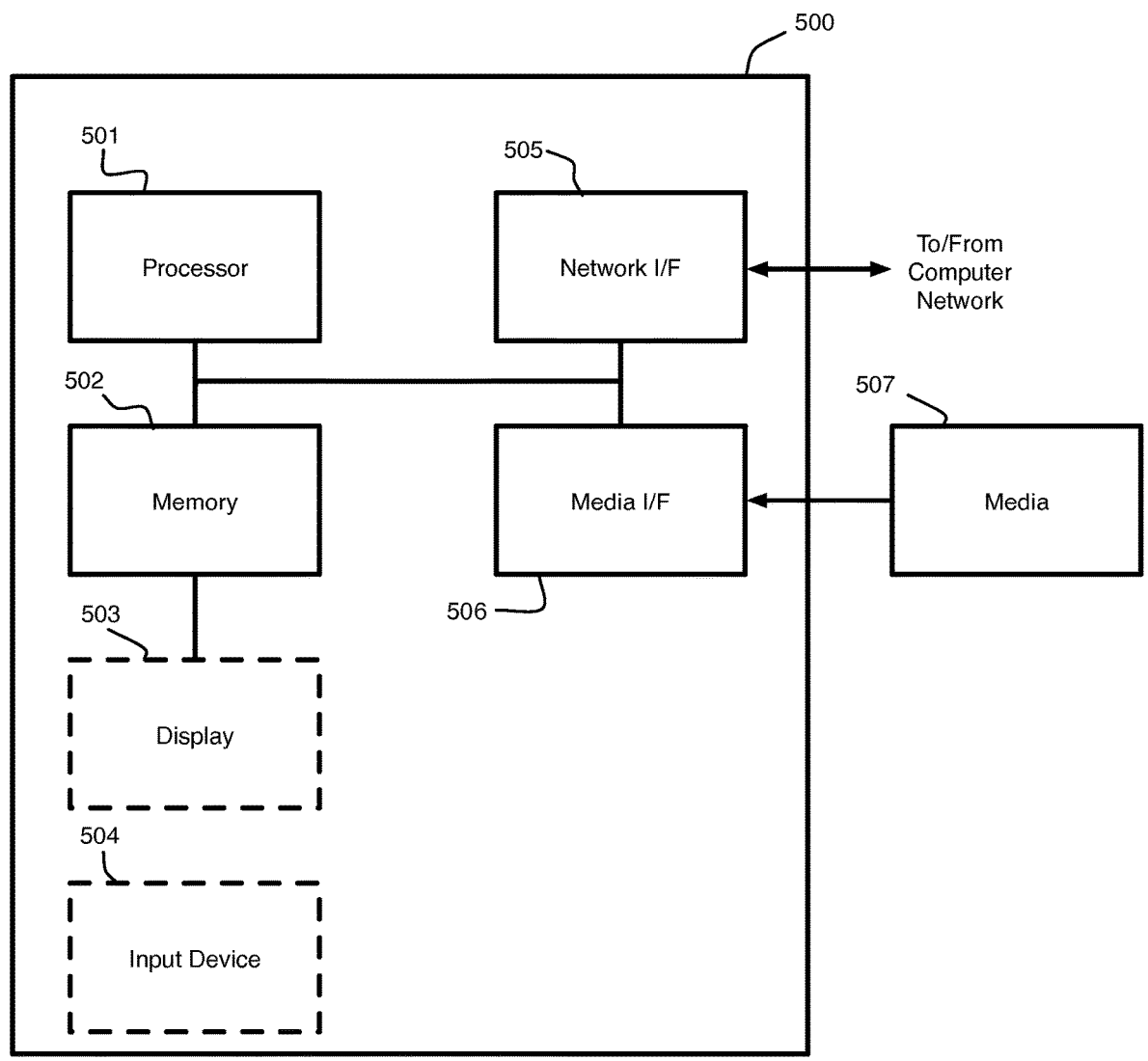
FIG. 5 is a diagram of a computer system configured for indexing video for identifying usability problems of a user interface according to an exemplary embodiment of the present invention.

Referring to FIG. 5; FIG. 5 is a block diagram depicting an exemplary computer system for indexing video for identifying usability problems of a user interface according to an embodiment of the present invention. The computer system shown in FIG. 5 includes a processor 501, memory 502, display 503, input device 504 (e.g., keyboard), a network interface (I/F) 505, a media IF 506, and media 507, such as a signal source, e.g., camera, Hard Drive (HD), external memory device, etc.

In different applications, some of the components shown in FIG. 5 can be omitted. The whole system shown in FIG. 5 is controlled by computer readable instructions, which are generally stored in the media 507. The software can be downloaded from a network (not shown in the figures), stored in the media 507. Alternatively, software downloaded from a network can be loaded into the memory 502 and executed by the processor 501 so as to complete the function determined by the software.

The processor 501 may be configured to perform one or more methodologies described in the present disclosure, illustrative embodiments of which are shown in the above figures and described herein. Embodiments of the present invention can be implemented as a routine that is stored in memory 502 and executed by the processor 501 to process the signal from the media 507. As such, the computer system is a general-purpose computer system that becomes a specific purpose computer system when executing routines of the present disclosure.

Although the computer system described in FIG. 5 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method for indexing a user interface test recording comprising:
    capturing, during a usability test session, a recording of a plurality of interactions of a user with the user interface;
    capturing, during the usability test session, an event stream including a plurality of user interface events performed by the user, each user interface event being defined by one or more types of user interface input submitted via the user interface;
    synchronizing, in time, the plurality of interactions and the plurality of user interface events;
    identifying a point of interest in the event stream, wherein the point of interest is correlated to a time in the recording of the plurality of interactions synchronized with the plurality of user interface events; and
    annotating the recording at a time correlated to when the point of interest occurred,
    wherein identifying the point of interest in the event stream further comprises building an event digraph comprising a plurality of nodes corresponding to respective ones of the plurality of user interface events performed by the user, the respective ones of the plurality of user interface events corresponding to respective ones of the plurality of interactions of the user with the user interface,
    wherein the point of interest is identified as corresponding to a certain node in the event digraph when:
    a number of nodes to reach the certain node is greater than a threshold number of nodes;
    an amount of time to reach the certain node is greater than a threshold time; or
    an elapsed time corresponding to the certain node is above a threshold elapsed time.

2. The method of claim 1, wherein the point of interest corresponds to an activity of a user.

3. The method of claim 1, wherein the point of interest corresponds to a period of inactivity of a user.

4. The method of claim 1, the event digraph further comprising a plurality of edges representing a sequence of the plurality of user interface events over time, wherein the event digraph models the plurality of user interface events over time.

5. The method of claim 1, wherein building the event digraph comprises labeling each of the plurality of nodes based on a concatenation of a corresponding user interface event type and a user interface element identification.

6. The method of claim 1, wherein the recording comprises a video of the plurality of user interactions with the user interface under test.

7. The method of claim 6, wherein the recording further comprises audio corresponding to at least one of the plurality of interactions with the user interface.

8. The method of claim 1, wherein the event digraph further comprises a root node representing a beginning of the usability test session, the method further comprising:
associating each node corresponding to a respective one of the plurality of user interface events with a mean distance to the root node for all occurrences of the respective one of the plurality of user interface events and a mean timestamp representing time from the beginning of the usability test session for all occurrences of the respective one of the plurality of user interface events.

9. The method of claim 8, further comprising updating the mean distance and the mean timestamp for the node corresponding to said respective one of the plurality of user interface events upon each repeated occurrence of said respective one of the plurality of user interface events.

10. The method of claim 8, wherein identifying the point of interest comprises determining that the certain node in the event digraph is part of a cyclic pattern based on at least one of:
a difference between the mean distance from the root node to the certain node and the mean distance from the root node to a set of neighbor nodes of the certain node; and
a difference between the mean timestamp of the certain node and the mean timestamp of the set of neighbor nodes of the certain node.

11. The method of claim 10, wherein identifying the point of interest comprises determining that the certain node in the event digraph is part of a cyclic pattern based further on at least one of:
a standard deviation of the mean distance from the root node to the set of neighbor nodes of the certain node; and
a standard deviation of the mean timestamp of the set of neighbor nodes of the certain node.

12. The method of claim 1, wherein the point of interest corresponds to a usability problem candidate.

13. The method of claim 1, wherein identifying the point of interest comprises determining that the certain node in the event digraph is part of a cyclic pattern.

14. A computer program product for indexing a user interface test recording, the computer program product comprising a computer readable storage medium having program instructions embodied therewith, the program instructions executable by a processor to cause the processor to perform a method comprising:
capturing, during a usability test session, a recording of a plurality of interactions of a user with the user interface;
capturing, during the usability test session, an event stream including a plurality of user interface events performed by the user, each user interface event being defined by one or more types of user interface input submitted via the user interface;
synchronizing, in time, the plurality of interactions and the plurality of user interface events;
identifying a point of interest in the event stream, wherein the point of interest is correlated to a time in the recording of the plurality of interactions synchronized with the plurality of user interface events; and
annotating the recording at a time correlated to when the point of interest occurred, wherein identifying the point of interest in the event stream further comprises building an event digraph comprising a plurality of nodes corresponding to respective ones of the plurality of user interface events performed by the user, the respective ones of the plurality of user interface events corresponding to respective ones of the plurality of interactions of the user with the user interface, wherein the point of interest is identified as corresponding to a certain node in the event digraph when:
a number of nodes to reach the certain node is greater than a threshold number of nodes;
an amount of time to reach the certain node is greater than a threshold time; or
an elapsed time corresponding to the certain node is above a threshold elapsed time.

15. An apparatus configured to index a user interface test recording comprising:
a recording device configured to capture, during a user interface test session, a video of a plurality of user interactions with the user interface; and
a computer program product comprising a computer readable storage medium having program instructions embodied therewith, the program instructions executable by a processor to:
capture, during the user interface test session, an event stream including a plurality of user interface events performed by a user,
synchronize, in time, the plurality of interactions and the plurality of user interface events performed by the user, each user interface event being defined by one or more types of user interface input submitted via the user interface,
generate a model of the user interface events,
identify a point of interest in the event stream, wherein the point of interest is correlated to a time in the recording of the plurality of interactions synchronized with the plurality of user interface events, and
annotate the video at a time correlated to when the point of interest occurred,
wherein identifying the point of interest in the event stream further comprises building an event digraph comprising a plurality of nodes corresponding to respective ones of the plurality of user interface events performed by the user, the respective ones of the plurality of user interface events corresponding to respective ones of the plurality of interactions of the user with the user interface,
wherein the point of interest is identified as corresponding to a certain node in the event digraph when:
a number of nodes to reach the certain node is greater than a threshold number of nodes;
an amount of time to reach the certain node is greater than a threshold time; or
an elapsed time corresponding to the certain node is above a threshold elapsed time.

16. The apparatus of claim 15, further comprising a display displaying the video including at least one annotation correlated to the time in the video the point of interest occurred.

17. The apparatus of claim 15, wherein the recording device records audio corresponding to at least one of the plurality of interactions with the user interface.

18. The apparatus of claim 15, the event digraph further comprising a plurality of edges representing a sequence of the plurality of user interface events over time, wherein the event digraph models the plurality of user interface events over time, and the digraph is stored in a memory accessible to the processor.

19. The apparatus of claim 15, wherein building the event digraph comprises labeling each of the plurality of nodes based on a concatenation of a corresponding user interface event type and a user interface element identification.

20. The apparatus of claim 15, wherein a signal is generated by the processor, wherein the signal is used to synchronize, in time, the plurality of interactions and the plurality of user interface events.

* * * * *